June 17, 1969     W. M. SHOFFNER     3,450,230
COUNTERMOUNTED POWER UNIT FOR UNLOADING MERCHANDISE CART
Filed March 15, 1967     Sheet 2 of 2
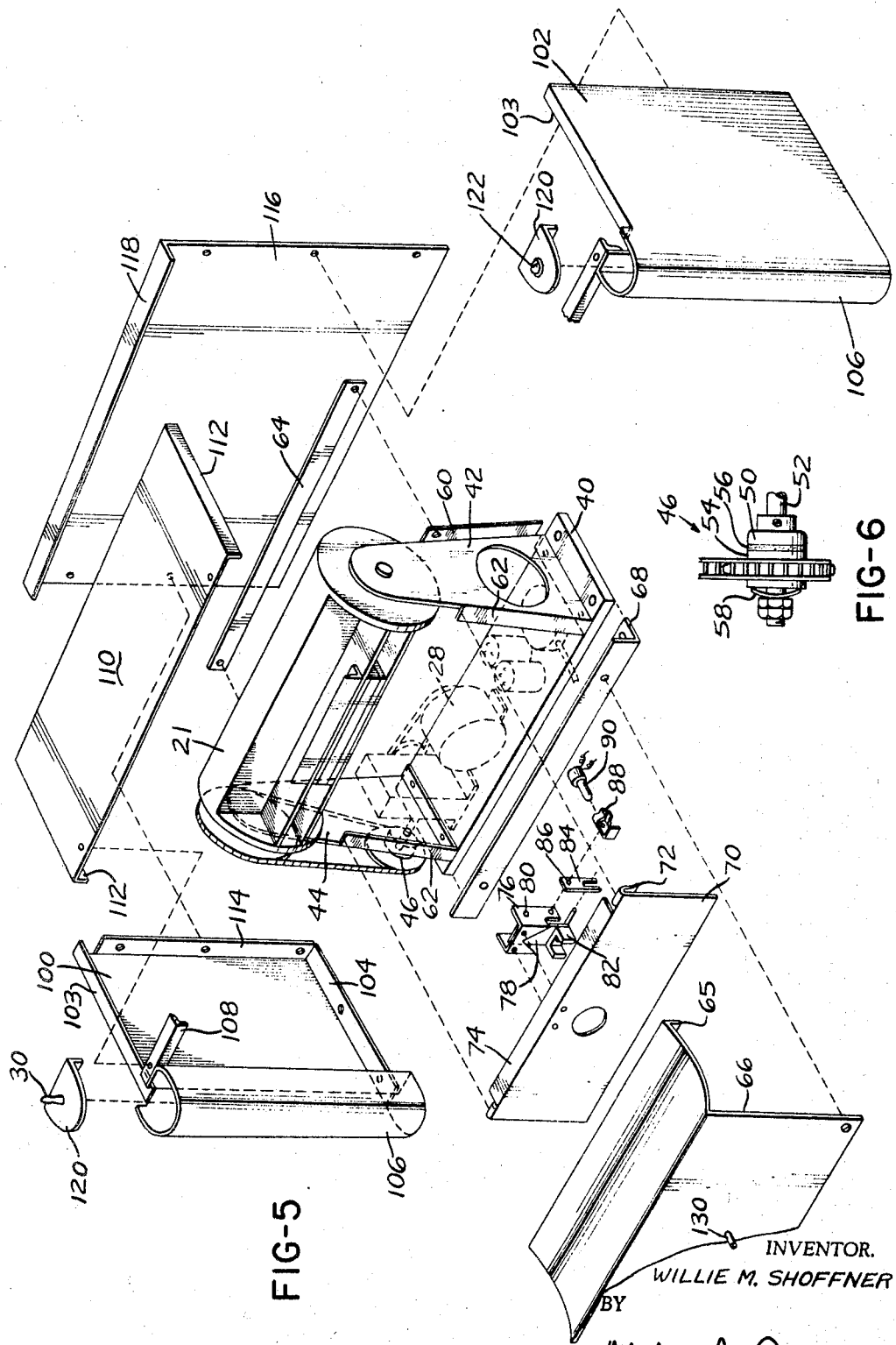
INVENTOR.
WILLIE M. SHOFFNER

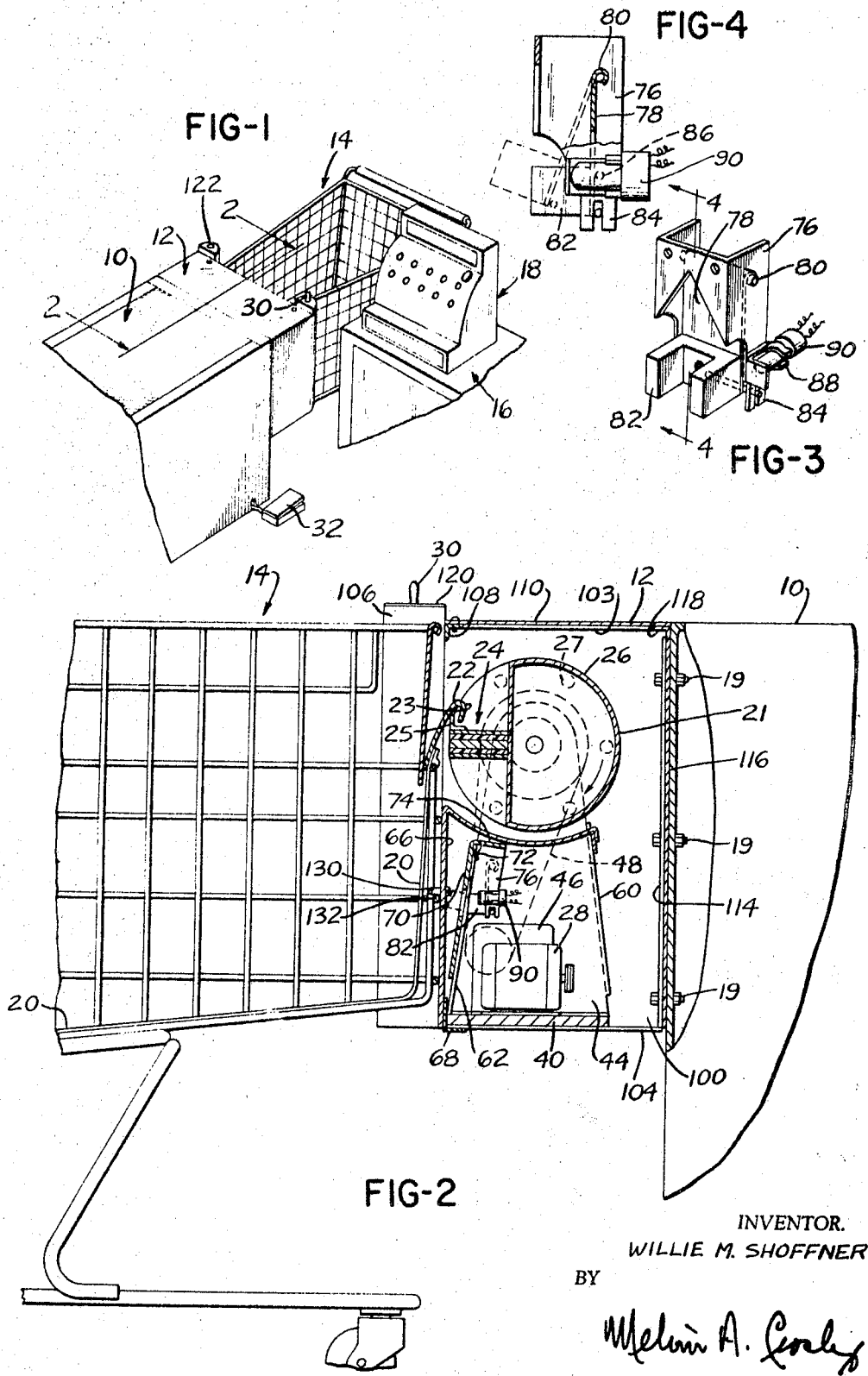

United States Patent Office 3,450,230
Patented June 17, 1969

3,450,230
COUNTERMOUNTED POWER UNIT FOR UN-LOADING MERCHANDISE CART
Willie M. Shoffner, R.R. 2, 318 S. Lutheran Church Road, New Lebanon, Ohio 45345
Filed Mar. 15, 1967, Ser. No. 623,301
Int. Cl. A47f 9/02; B65g 67/24
U.S. Cl. 186—1                    6 Claims

ABSTRACT OF THE DISCLOSURE

Self-contained power unit adapted for mounting on the end of a merchandise check-out counter and having a motor driven reel adapted for engaging the end of a belt in a merchandise cart to draw the belt from the cart and thereby elevate merchandise to a level where it can be picked up by the check-out desk.

Background of the invention

The present invention concerns merchandise check-out installations, and is particularly concerned with a counter mounted power unit forming a part of such an installation.

In my copending application, Ser. No. 611,734, filed Jan. 25, 1967, now Patent No. 3,369,631, there is shown a merchandise handling system for retail outlets wherein the consumer collects merchandise in a cart which is taken to a check-out counter where the merchandise is checked out by a clerk and the cost thereof entered in a register and totalled.

The systems according to my invention utilize carts in which a belt is connected at its trailing end to the battery of the inwardly swingable back wall of the cart and extends forwardly along the top of the bottom wall of the cart, and then upwardly along the inside of the front wall of the cart and terminates in a leading and extending through the front wall of the cart near the top, with a metal clip on the leading end of the belt for engagement by a rotatable reel or windlass on the counter. Rotation of the reel is had by way of a reversible motor under the control of the check-out clerk so that the reel can be driven to draw the belt from the cart and thereby elevate merchandise in the cart to within easy reach of the clerk, and also so the reel can be driven to feed the belt back into the cart after removal of the merchandise from the cart thereby to release the cart from the counter.

A proximity switch is employed to detect when the cart is in the proper position relative to the counter so the motor driving the reel cannot be energized in the absence of a cart.

Heretofore, in order to practice my invention, a special counter unit was built with the reel and drive motor built into the counter. Such counters are expensive, and while they are generally satisfactory for new installations, do not permit the advantages of the present invention to be realized in existing store installations without the high expense of replacing entire counters. Since existing stores far exceed new stores in number, it will be apparent that the present method of making the power unit only as a built-in part of the counter is restrictive of the field of appreciation.

It is difficult, furthermore, to apply mass production principles to the manufacture of the power unit consisting of the reel and drive motor and accessories when they are built with a counter.

The present invention

The present invention is concerned with an organization of the reel and drive motor and accessories into a single compact unit adapted for mounting on the cart end of a check-out counter so that it is adapted to, not only new installations, but also to existing installations to convert them for the practice of my automated check-out system.

Objects of the invention

The present invention has as objectives, the provision of a self-contained power unit of the nature referred to; which is compact; adapted for mounting on the cart end of new or existing counters; which is adapted for mass production techniques; and which can be made of stainless steel or the like, to present a good appearance and simplify maintenance.

The nature of the present invention will become more clearly apparent upon reference to the following specification taken together with the accompanying drawings, in which:

FIGURE 1 is a perspective view showing a check-out system according to the present invention;

FIGURE 2 is a fragmentary sectional view indicated by line II—II on FIGURE 1;

FIGURE 3 is a perspective view showing a proximity switch forming a part of the invention;

FIGURE 4 is a section on line IV—IV of FIGURE 3;

FIGURE 5 is an exploded perspective view of the power unit of the present invention; and FIGURE 6 is a view of a slip clutch used in the invention.

Referring to the drawings more in detail, in FIGURE 1, 10 is the check-out counter, 12 is the power unit on the cart end of the counter, 14 is the cart, and 16 is the counter on which cash register 18 is mounted.

As will be seen in FIGURE 2, power unit 12 is mounted on the end of counter 10 by bolts 19. The power unit is thus adapted for connection to a simple counter construction, including existing check-out counter installations. The top of the power unit is coplanar with the top of counter 16. The power unit, as will be seen in FIGURES 2 and 4, comprises a main outer frame in which is mounted a subframe carrying a drive motor and reel. The main frame is enclosed by sheet metal panels.

The cart in FIGURE 2 will be seen to have a belt-like member 20 therein which, at its rear end, (not shown), is connected to the lower portion of the inwardly swingable back wall of the cart and extends forwardly on top of the bottom wall of the cart and up the inside of the front wall of the cart, and has its front end connected to a clip 22 of magnetic metal. Clip 22 extends forwardly from the front wall of the cart and is adapted, when the cart is in its FIGURE 2 position, to be engaged by member 24 which is attached to, and extends longitudinally of, reel 26.

Reel 26 is rotatably supported in the subframe of the power unit 12 and is connected to reversible drive motor 28 also carried in the subframe of the power unit. When motor 28 is energized to drive reel 26 clockwise in FIGURE 2, belt 20 will be drawn from the cart and elevate articles of merchandise therein to within easy reach of a check-out clerk standing in front of register counter 16. A hand switch 30 on unit 12 can be availed of for this purpose, and a foot operated switch 32 can also, or alternatively, control the energization of the motor.

When motor 28 is thereafter energized to drive reel 26 counterclockwise in FIGURE 2, the belt 20 will be fed back into the cart, and clip 22 of the belt will disengage from the drive member 24 of the reel and release the cart from the power unit.

Member 24 of reel 26 consists of magnetic metal strips with magnet strips, rubber-like magnets, for example, disposed therebetween so as to draw clip 22 forwardly against member 24 so that angle 25 of member 24 can engage under turned back end 23 of clip 22.

Normally, this engagement will occur as a matter of course, but I prefer to make it certain by the use of the magnets.

Reel 26 is shown as being formed of sheet metal but I contemplate constructing this part of the structure from end plates with circumferentially spaced axial rods extending therebetween. Such rods are shown in dot-dash outline at 27 in FIGURE 2 and would replace the sheet metal of the reel.

The subframe of the power unit will be seen in FIGURES 2 and 3 to comprise a base member 40, wood, for example, and laterally spaced bracket elements or side members 42 and 44 upstanding therefrom. Reel 26 is journalled in the upper ends of bracket elements 42 and 44 and motor 28 is mounted on base 40. Motor 28 drives through a speed reducing gear box 46, also mounted on base 40, to a slip clutch 46 and thence, by way of belt or chain 48, to reel 26.

Slip clutch 46, shown in FIGURE 6 comprises a collar 50 fixed to gear box driven shaft 52, and a pulley or sprocket 54 rotatable on shaft 52. Friction disc 56 is disposed between sprocket 4 and collar 50 and adjustable spring means 58 urges the sprocket and disc and collar into pressure interengagement. The maximum torque that can be exerted on reel 26 can thus be regulated.

Bracket elements or side members 42 and 44 have outwardly turned flanges 60 at the back and inwardly turned flanges 62 at the front. A strap 64 extends laterally between and is connected to flanges 60. This strap braces the bracket elements on each other and also serves to engage lip 65 on panel 66 of the main frame which extends under the bottom of reel 26 and then downwardly to form the front wall of the main frame of the unit. The front lower end of panel 66 is fixed to angle 68 at the front edge of base 40. It will be appreciated that panel 66, when detached from angle 68, can be removed to gain access to the inside of the power unit for servicing the unit.

Another panel 70 in the unit has clip portions 72 at the sides which clip over the upper ends of flanges 62. Panel 70 has a stiffening flange 74 along the top edge. Panel 70 supports the proximity switch of FIGURES 3 and 4. The switch structure has a support bracket 76 which is fixed to panel 70, as by bolting or riveting. A magnet support arm 78 is pivoted at 80 in bracket 76 and has a magnet 82 on the lower end swingable in the fore and aft direction in the power unit. Bracket 76 is cut out in front so the magnet can swing forwardly to or near the back surface of panel 66 (FIG. 2).

A second arm 84 is pivoted at 86 on bracket 76 and has a spring clip 88 at its lower end to receive mercury switch 90. A pin 92 on arm 78 extends into slot 94 of arm 84 so the two arms will swing together with arm 84, due to its shorter length, taking a greater angular movement than arm 78.

When a cart is placed in the position of cart 14 in FIGURE 2, the steel of the cart, as a steel plate provided on the cart for that purpose, attracts magnet 82 so that arms 78 and 84 swing forwardly thus closing mercury switch 90 and preparing the motor circuit so that operation of the manual switch means will cause motor 28 to run. When the cart is moved away from its FIGURE 2 position, arms 76 and 84 swing back and switch 90 opens and motor 28 cannot be energized.

The main frame of the unit has side panels 100 and 102 which have bottom flanges 104 that engage beneath the ends of base 40. Panels 100 and 102 have rounded front portions 106 that project from the cart side of the power unit and guide the cart into proper lateral position when it is pushed into its FIGURE 2, or unloading, position.

The free edges of portions 106 are bent back and have connected therebetween the angle 108. Angle 108 is connected to the front edge of the top panel 110 of the main frame which has side flanges 112 which depend on the outside faces of side panels 100 and 102 of the main frame when the unit is assembled. Panels 100 and 102 also have top flanges 103 which stiffen the panels and engage beneath the sides of top panel 110.

Panels 100 and 102 have turned in flanges 114 at the back edges which are secured to the side edges of back panel 116 of the main frame. Panel 116 has a top flange 118 that engages under the back edge of top panel 110 in supporting relation thereto.

The bolts 19 which connect the unit to counter 16 can also connect panel 116 to flanges 114, or separate bolts can be provided for effecting these two connections.

In any case, top panel 110 and front panel 66 which is suspended on the side members of the subframe, panel 70 can all be removed quite easily to gain complete access to the panel 70 inside of the unit for service operations.

The upper ends of portions 106 are closed by top caps 120, one of which may carry switch 30, while the other may carry lamp 122 which is illuminated when the cart is in its FIGURE 2 position.

It is preferred to use a quiet operating condenser starting motor and base 40 of the subframe provides space, as will be seen in FIGURE 2, for mounting such auxiliaries as condensers, boxes, and the like.

While there is little chance that the front end of the cart will lift when belt 20 is pulled therefrom, I, nevertheless, prefer to provide a key or pin 130 on panel 66 projecting outwardly therefrom which engages over a lateral wire 132 on the front of the cart when the cart is in its FIGURE 2, or unloading position. The pin 130 and projections 106 of the side panels hold the cart locked in position once reel 26 has caught the clip 22 of the belt 20.

At least the exposed outside panels of the power unit are preferably formed of stainless steel for the sake of appearance and reduced maintenance. The particular panels which it is of advantage to make from stainless steel are panels 66, 100, 102 and 110, and top caps 120, all of the main frame. Other parts of the unit are concealed and can be made of ordinary steels, such as the steel parts of the subframe and panel 70. The reel, which is exposed when the cart is removed, may also be made of stainless steel.

I claim:

1. In a merchandise check-out system in which a merchandise cart is provided with a belt connected at its back end to the bottom of the inwardly swingable back wall of the cart and extending forwardly along the cart bottom and up the inside of the front wall of the cart, and terminating at its front end in a clip projecting in front of the front wall of the cart near the top, and a reel is provided at the check-out counter adapted to engage the clip on the front end of the belt and rotatable to draw the belt from the cart to elevate merchandise in the cart to within easy reach of the check-out clerk at the counter, and with a drive motor connected to the reel and under the control of the check-out clerk, the improvement comprising; a box-like integrated unit having a counter side and a cart side and containing said reel and motor, said unit comprising an outer main frame having back and side walls and adapted for mounting on the cart end of a check-out counter said back wall being located on the counter side of said unit and adapted to be secured to the counter, said side walls being connected to the side edges of said back wall and extending outwardly in spaced parallel relation from the counter, an inner subframe in the main frame comprising a rigid elongated horizontal base member having its length parallel to said back wall of said main frame and side members mounted on the base member near the ends thereof and upstanding therefrom, said base member supporting said drive motor and said side members at the upper ends thereof rotatably supporting said reel, a drive connection leading from said motor to said reel and including a speed reducer in said subframe, an energizing circuit for said motor having switch means therein including a manually operable switch on said main frame positioned for actuation by the check-out clerk for reversibly energizing said motor, a panel detachably supported by the said side members on the cart side of said subframe, a proximity switch on said panel connected in said energizing circuit and sensitive to the presence of a cart in unloading position at the cart side of the unit for enabling said energizing circuit, a top panel for said main frame detachably mounted on said main frame above said reel and extending over and resting on the tops of said side walls, and a front wall for said main frame detachably mounted on the cart side of said main frame and extending from the bottom thereof upwardly to near the said reel and curving backwardly beneath said reel and detachably connected to the edges of said side members on the counter side of said subframe.

2. A unit according to claim 1, in which said side walls of said main frame project outwardly from the said front wall of said frame and are spaced laterally so as to be disposed on and closely adjacent opposite sides of a cart presented to said unit thereby to center the cart with respect to the unit.

3. A unit according to claim 2, in which said front wall of said main frame has at least one key element projecting therefrom for engagement from beneath by a region of the front end of a cart presented to said unit to prevent lifting of the front end of the cart as the belt is drawn in about said reel.

4. A unit according to claim 2 in which said proximity switch comprises a magnet operated switch and includes a magnet adapted to be attracted by a cart presented to said unit in unloading position, a bracket attached to the back of said front panel, a first arm pivotally suspended in said bracket and at the lower end supporting said magnet so the magnet can swing toward a cart when the cart is moved into said loading position, a mercury switch, a second arm pivotally suspended in said bracket and supporting said mercury switch, and a sliding connection between said arms so pivotal movement of said first arm will cause pivotal movement of the second arm, the pivot for said second arm being closer to the region of sliding connection of said arms than the pivot for said first arm whereby the pivotal movement of said second arm is greater than that of said first arm and said mercury switch will tilt further than said magnet.

5. A unit according to claim 2, in which said switch means includes a foot operated switch at the side of said counter.

6. A unit according to claim 2, in which said main frame includes transverse rigid internal structural members extending between and connected to said side walls at the top and bottom at the cart end of said side walls, and a further rigid structural member extending between and connected to said side members of said subframe on the counter side thereof.

References Cited
UNITED STATES PATENTS

| | | | |
|---|---|---|---|
| 3,083,791 | 4/1963 | Shoffner | 186—1 |
| 3,185,322 | 5/1965 | Matthews | 214—75 |
| 3,270,837 | 9/1966 | LaChance | 186—1 |
| 3,286,794 | 11/1966 | Schoffner | 186—1 |

ROBERT G. SHERIDAN, *Primary Examiner.*

U.S. Cl. X.R.

214—44